United States Patent
Ganzel

(10) Patent No.: US 12,227,159 B2
(45) Date of Patent: Feb. 18, 2025

(54) FLUID SEPARATOR AND BRAKE SYSTEMS USING SAME

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 641 days.

(21) Appl. No.: 17/400,210

(22) Filed: Aug. 12, 2021

(65) Prior Publication Data
US 2023/0047015 A1 Feb. 16, 2023

(51) Int. Cl.
- B60T 8/176 (2006.01)
- B60T 7/04 (2006.01)
- B60T 8/40 (2006.01)
- B60T 13/68 (2006.01)

(52) U.S. Cl.
CPC .............. B60T 8/176 (2013.01); B60T 7/042 (2013.01); B60T 8/4081 (2013.01); B60T 13/686 (2013.01)

(58) Field of Classification Search
CPC ........ B60T 8/409; B60T 8/176; B60T 8/4081; B60T 13/745; B60T 13/686; B60T 7/042; B60T 2270/402
USPC ...................................................... 188/106 P
See application file for complete search history.

(56) References Cited

U.S. PATENT DOCUMENTS

| | | | |
|---|---|---|---|
| 2007/0024111 A1* | 2/2007 | Ganzel | B60T 8/3655 303/116.2 |
| 2020/0307538 A1* | 10/2020 | Ganzel | B60T 8/4081 |
| 2021/0146907 A1* | 5/2021 | Ganzel | G01M 3/2876 |
| 2022/0274572 A1 | 9/2022 | Ganzel | |
| 2022/0274576 A1 | 9/2022 | Ganzel | |

FOREIGN PATENT DOCUMENTS

| | | |
|---|---|---|
| DE | 102009048286 A1 | 4/2011 |
| EP | 4095005 A1 | 11/2022 |
| WO | 2019/195542 A1 | 10/2019 |

OTHER PUBLICATIONS

German Search Report for corresponding German Application Serial No. 10 2022 208 249.4, dated Feb. 9, 2023, pp. 1-10.

* cited by examiner

Primary Examiner — Robert A. Siconolfi
Assistant Examiner — San M Aung
(74) Attorney, Agent, or Firm — Tarolli, Sundheim, Covell & Tummino LLP

(57) ABSTRACT

A fluid separator includes a separator housing defining a longitudinal bore having first and second bore ends. A first fluid passage is in fluid communication with the bore at the first bore end. A second fluid passage is in fluid communication with the bore adjacent the second bore end. A third fluid passage is in fluid communication with a portion of the bore spaced apart from both the first and second bore ends. A free-floating piston is located inside the bore and configured for longitudinal movement with respect to the bore responsive to fluid pressure within the bore. A biasing spring urges the piston toward the second bore end. An end cap is located at the second bore end. The end cap is maintained on the housing via at least two retainers.

26 Claims, 6 Drawing Sheets

FLUID SEPARATOR AND BRAKE SYSTEMS USING SAME

TECHNICAL FIELD

This disclosure relates to a fluid separator and, more particularly, to a fluid separator configured for inclusion in a brake system having normal non-failure and backup braking modes.

BACKGROUND

A brake system may include a plurality of wheel brakes and a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include an electronic control unit that can be used to provide a braking command to the wheel brakes, autonomously and/or manually (e.g., via the use of an operator-manipulable brake pedal).

SUMMARY

In an aspect, a fluid separator configured for inclusion in a brake system having normal non-failure and backup braking modes is disclosed. A separator housing defines a longitudinal bore having first and second longitudinally separated bore ends. A first fluid passage is in fluid communication with the bore at the first bore end. A second fluid passage is in fluid communication with the bore adjacent the second bore end. A third fluid passage is in fluid communication with a portion of the bore spaced apart from both the first and second bore ends. A free-floating piston is located inside the bore and configured for longitudinal movement with respect to the bore responsive to fluid pressure within the bore. A biasing spring urges the piston toward the second bore end. An end cap is located at the second bore end. The end cap is maintained on the housing via at least two retainers. When the brake system is in the normal non-failure braking mode, a primary fluid route is defined between the first and third fluid passages through at least a portion of a body of the piston. When the brake system is in the backup braking mode, the piston is urged toward the first bore end by fluid pressure from the second fluid passage to at least partially close the primary fluid route. Travel of the piston toward the first bore end is operative to raise fluid pressure within the bore adjacent the first fluid passage and urge fluid out of the bore through the first fluid passage.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
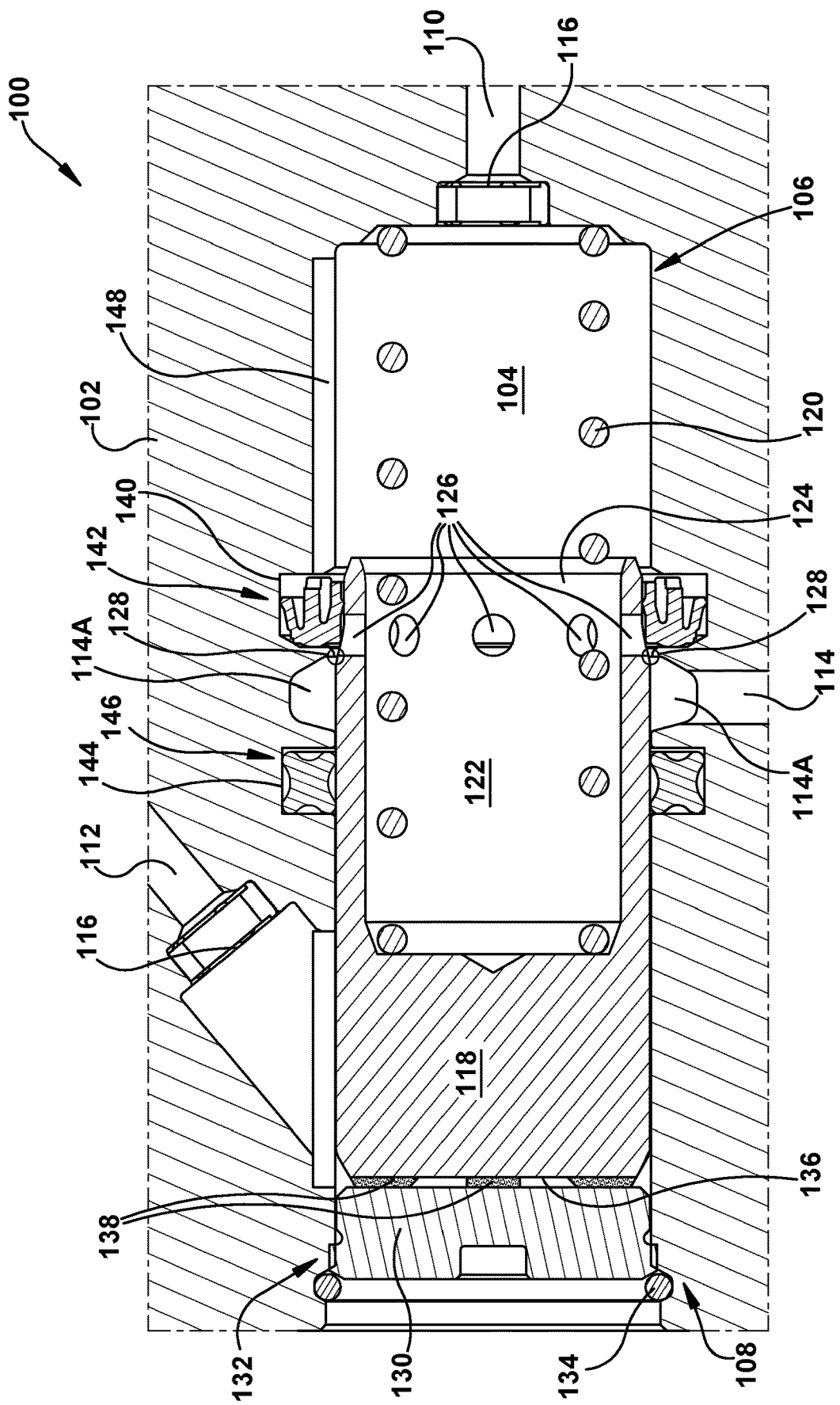
FIG. 1 is a schematic cross-sectional view of a component of a brake system according to an aspect of the present invention.

FIG. 1 depicts a fluid separator 100 configured for inclusion in a brake system having normal non-failure and backup braking modes. The fluid separator 100 includes a separator housing 102 defining a longitudinal bore 104 having first and second longitudinally separated bore ends 106 and 108, respectively. The "longitudinal" direction, as used herein, is substantially parallel to arrow "L", which is substantially in the horizontal direction, in the orientation of FIG. 1.

Components of the brake system, including the fluid separator 100, may be housed in one or more blocks or housings. The block or housing may be made from solid material, such as aluminum, that has been drilled, machined, or otherwise formed to house the various components. Fluid conduits may also be formed in the block or housing, between two or more components or between a component and a "port" for attachment to a structure outside the block or housing. Accordingly, the separator housing 102 may comprise a portion of a block or housing that defines and/or at least partially encloses one or more other components of a brake system, as discussed below.

A first fluid passage 110 is in fluid communication with the bore 104 at the first bore end 106. A second fluid passage 112 is in fluid communication with the bore 104 adjacent the second bore end 108. A third fluid passage 114 is in fluid communication with a portion of the bore 104 spaced apart from both the first and second bore ends 106 and 108. The third fluid passage 114 includes an annular fluid groove 114A defined in the bore 104 circumferentially around the piston 118.

Figure 2:
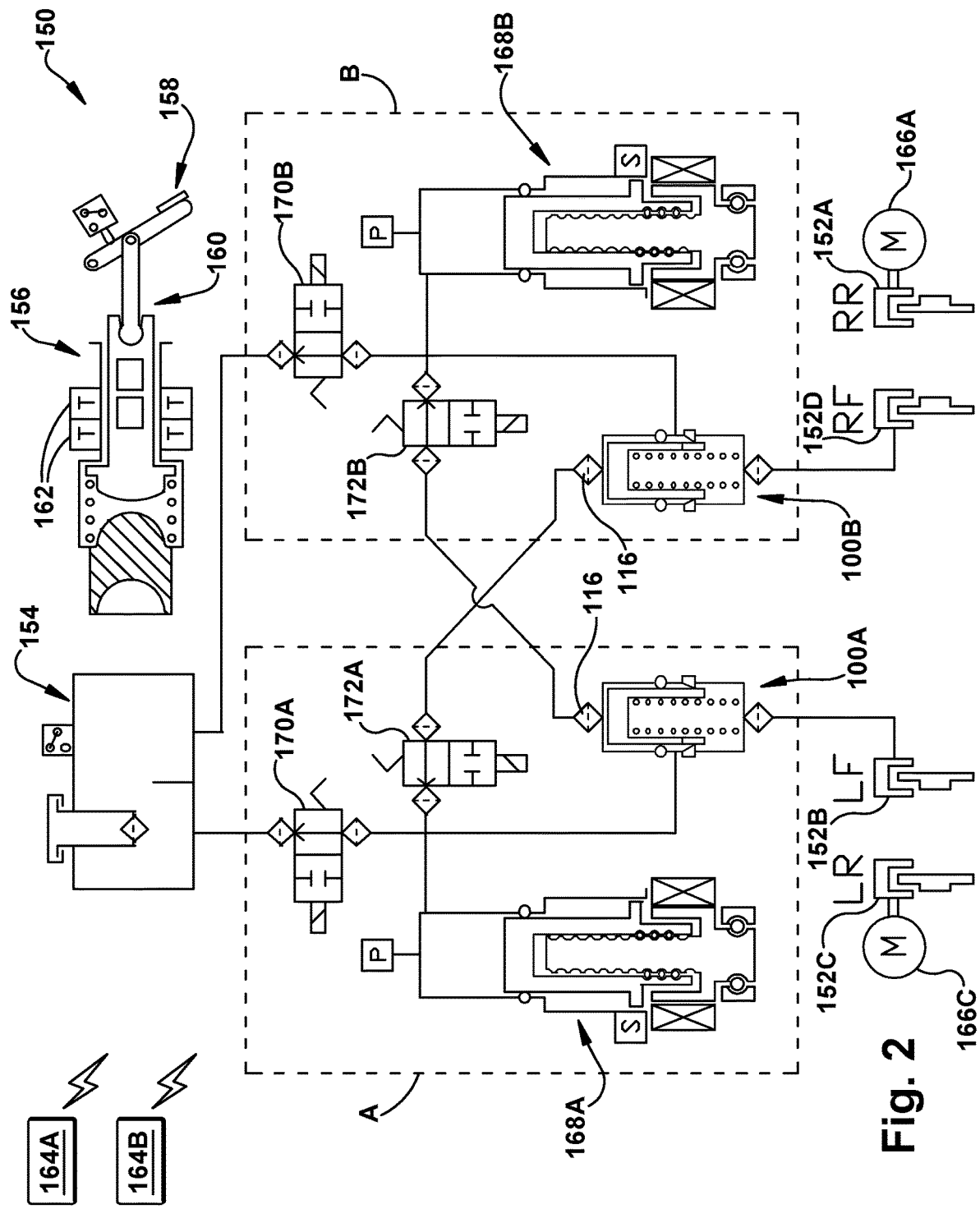
FIG. 2 is a schematic hydraulic diagram of a first brake system including the component of FIG. 1.

At least one of the first, second, and third fluid passages 110, 112, 114 may include an inline filter (shown schematically at 116 in FIGS. 1-2, with like symbols to the 116-labeled "diamonds" in FIG. 2 representing appropriate filters throughout the Figures).

It is noted that the fluid separator 100, when supplying fluid to a wheel brake, may be mounted in a corresponding brake system (via the separator housing 102) such that the third fluid passage 114 (which is most directly fluidly connected to the wheel brake) is at a higher elevation than the remaining parts of the fluid separator 100. As a result, hydraulic fluid is prevented from draining out of the brake system through the third fluid passage 114 if, for example, the connected power transmission unit has a failure that result in loss of hydraulic fluid.

The first and third fluid passages 110 and 114 may intersect with the bore 104 in at least one of a longitudinal and a lateral relationship thereto, as shown in FIG. 1. The "lateral" direction, as referenced herein, is substantially perpendicular to the longitudinal direction (i.e., within a vertical plane extending into and out of the plane of the page), in the orientation of FIG. 1. The second fluid passage 112, however, may intersect with the bore 104 at an angle to the longitudinal direction L which is not parallel or perpendicular thereto, also as shown in FIG. 1. For example, the second fluid passage 112 may intersect with the bore 104 at an oblique or acute angle to the longitudinal direction L as shown in FIG. 1. It is contemplated, though, that any of the first through third fluid passages 110, 112, 114 can intersect with the bore 104 at any suitable parallel, perpendicular, or other angle as desired for a particular use application of the fluid separator 100, and for any reason such as, but not limited to, fitting into a particular space and/or aligning with another component of a particular brake system.

A free-floating piston 118 is located inside the bore 104 and is configured for longitudinal movement with respect to the bore 104 responsive to fluid pressure within the bore 104. "Free-floating" is used herein to indicate that the piston 118 is not tied to an external rod or other component extending outside the longitudinal bore 104, but the piston 118 instead moves back and forth within the bore 104 responsive to local fluid pressure influences within the bore 104. A biasing spring 120 (shown in schematic cross-section in FIG. 1) urges the piston 118 toward the second bore end 108.

As shown in FIG. 1, the piston 118 may be of a cup-type including an internal piston cavity 122 configured to receive a portion of the biasing spring 122 therewithin. The piston 118 includes a skirt area 124 substantially laterally surrounding a circumference of the biasing spring 122. The skirt area 124 includes a plurality of piston bores 126 extending substantially laterally through the body of the piston 118. The piston bores 126 are configured to selectively place an interior portion of the skirt area 124 in fluid communication therethrough with the third fluid passage 114, responsive to a longitudinal position of the piston 118 within the bore 104.

That is, when the piston 118 is in the leftmost position shown in FIG. 1, a small annular gap (circled at 128 in FIG. 1) facilitates passage of hydraulic fluid from the portion of the bore 104 adjacent the first bore end 106, through the piston bores 126, through the annular gap 128, into the annular fluid groove 114A of the third fluid passage 114, and through the unidirectionally extending portion of the third fluid passage 114. More broadly, when the brake system is in the normal non-failure braking mode, the piston 118 is located within the bore 104 in such a way that a primary fluid route is defined between the first and third fluid passages 110 and 114 through at least a portion of a body of the piston 118—as shown, through the piston bores 126. Fluid in the primary fluid route, stated otherwise, passes through at least one piston bore 126 and through the annular fluid groove 114A under fluid pressure from a chosen one of the first and third fluid passages 110, 114, with that choice depending on the flow direction desired.

Conversely, when the piston 118 moves toward the right (in the orientation of FIG. 1), the piston bores 126 are moved out of fluid communication with the annular fluid groove 114A of the third fluid passage 114 (thus closing the annular gap 128), and further rightward motion of the piston 118 pressurizes the fluid inside the bore 104 and the internal piston cavity 122 to force fluid out the first fluid passage 110. That is, when the brake system is in the backup braking mode, the piston 118 is urged toward the first bore end 106 (i.e., rightward, in the orientation of FIG. 1) by fluid pressure from the second fluid passage 112 to at least partially close the primary fluid route (by moving the piston bores 126 out of fluid communication with the annular fluid groove 114A). Accordingly, travel of the piston 118 toward the first bore end 106 is operative to raise fluid pressure within the bore 104 adjacent the first fluid passage 110 and urge fluid out of the bore 104 through the first fluid passage 110.

An end cap 130 is located at the second bore end 112 to prevent egress of fluid from the bore 104 to an ambient space outside the separator housing 102. The end cap 130 is maintained on the separator housing 102 via at least two retainers of any suitable type, with the retainers shown generally at 132. For example, and as shown in the embodiment of FIG. 1, a first retainer may be a clinch of the end cap 130 into engagement with the separator housing 102, and a second retainer may be a retention ring 134 (e.g., a wire ring or snap ring) extending substantially about a circumference of the end cap 130 (either around a body of the end cap 130 or "outboardly" adjacent the end cap 130) to maintain the end cap 130 in a predetermined relationship with the separator housing. Fasteners, welds, adhesives, threaded retention interface, staked retention interface, any other type of retainer, or any combination thereof could be used as retainers 132; one of ordinary skill in the art can provide one or more suitable retainers 132 to a fluid separator 100 for a particular use environment.

A piston face 136 of the piston 118 is located longitudinally adjacent the end cap 130 and in fluid communication with the second fluid passage 112. Fluid pressure from the second fluid passage 112 against the piston face 136 selectively urges the piston 118 toward the first bore end 106 (rightward, in the orientation of FIG. 1) against a spring force of the biasing spring 120. In this manner, the fluid separator 100 can be used to direct and supply pressurized hydraulic fluid to any desired brake(s) of the brake system, in either a normal non-failure mode or a backup braking mode, as will be described in detail below.

The piston face 136 may include at least one standoff protrusion 138 configured for selective contact with the end cap 130 to maintain longitudinal spacing of at least an other portion of the piston face 136 relative to the end cap 130. As shown in FIG. 1, the dark-shaded standoff protrusions 138 prevent the entire piston face 136 from butting up flush with the end cap 130, which could undesirably result in "hydraulic lock" of the piston 118, thus preventing piston 118 movement, under certain conditions.

The bore 104 may define a first seal groove 140 longitudinally interposed between the third fluid passage 114 and the first bore end 106. The first seal groove 140, when present, may be configured to selectively receive a lip seal 142 thereinto. The lip seal 142 engages with an outer surface of the piston 118 to resist fluid communication from the first fluid passage 110 to the third fluid passage 114 around the outer portion of the skirt area 124 of the piston 118, such as when the piston 118 has moved rightwardly enough to take the piston bores 126 out of fluid communication with the third fluid passage 114. However, due to the directional shape of the lip seal 142, a predetermined amount of fluid "seepage" from the third fluid passage 114 toward the first fluid passage 110 may be permitted by the lip seal 142, such as when a residual or limited amount of fluid is supplied to the third fluid passage 114 in the backup braking mode. The lip seal 142 may provide a "check valve" function to help avoid lockup and balance the side-port pressure of the fluid separator 100. It should be noted, however, that the lip seal 142 type check valve function is contemplated for use mainly (though not exclusively) when the fluid separator 100 itself has a failure that prevents the piston 118 from returning to the "normal non-failure" operational mode (the leftmost position, as shown in FIG. 1).

The bore 104 may also or instead define a second seal groove 144 longitudinally interposed between the third fluid passage 114 and the second bore end 108. The second seal groove 144, when present, is configured to selectively receive a bidirectional seal 146 therein. The bidirectional seal 146 engages with an outer surface of the piston 118 to resist fluid communication in either direction between the first and second bore ends 106 and 108.

The bore 104 may include at least one longitudinally extending relief slot 148 in a wall of the bore 104, the relief slot being interposed between the first and third fluid passages 110 and 114. When present, the relief slot 148 may permit fluid flow therethrough when at least a portion of the piston 118 is laterally adjacent the relief slot 148 within the bore 104. Indeed, a secondary fluid route may be defined from the third fluid passage 114, through the relief slot 148, and to the first fluid passage 110 when at least a portion of the piston 118 is laterally adjacent the relief slot 148 within the bore 104. The relief slot 148, when present, allows fluid to move past the piston 118 when the piston 118 moves toward the right, in the orientation of FIG. 1.

When the fluid separator 100 is in a "passive" or "non-powered" mode during a normal non-failure braking mode, the biasing spring 120 pushes the free-floating piston 118 toward the second bore end 108 (leftward, in the orientation of FIG. 1), to allow pressurized hydraulic fluid to flow, for example, from a pressurized fluid source into the third fluid passage 114, along the primary fluid route through the annular gap 128 and through the piston bores 126, through the bore 104 and out the first fluid passage 110, to hydraulically actuate a wheel brake in fluid communication with the first fluid passage 110. Then, at a desired time (such as during a backup braking mode after a failure of some component), pressurized hydraulic fluid is supplied (e.g., from a different pressurized fluid source) into the second fluid passage 110, which pushes against the piston face 136 and overcomes the force of the biasing spring 120 to place the fluid separator 100 into an active or powered mode. When the piston 118 moves a predetermined distance toward the first bore end 106 (rightward, in the orientation of FIG. 1), the piston bores 126 are taken out of fluid communication with the third fluid passage 114, thus "shutting off" the primary fluid route. Further motion of the piston 118 toward the first fluid passage 110 then pushes hydraulic fluid already in the bore 104 adjacent the first bore end 106 under pressure and into the first fluid passage 110, to facilitate selective application of the wheel brake using pressure developed within the bore 104 via movement of the piston 118. As a result, the second fluid passage 112 can be used to facilitate operation of the attached wheel brake in a backup braking mode.

FIG. 2 depicts a brake system 150 which uses at least one fluid separator 100 of FIG. 1. The brake system 150 is similar in concept to the brake system shown in FIG. 7 of copending U.S. patent application Ser. No. 17/188,288, filed 1 Mar. 2021 and titled "Apparatus and Method for Control of a Hydraulic Brake System" (hereafter referenced as "the '288 application"), the entire contents of which are incorporated herein by reference. The brake system 150 is shown in FIG. 2 as a hydraulic brake by wire system in which electronically controlled fluid pressure is utilized to apply braking forces for at least a portion of the brake system 150. The brake system 150 may suitably be used on a ground vehicle, such as an automotive vehicle having four wheels with a wheel brake associated with each wheel. Furthermore, the brake system 150 can be provided with other braking functions such as anti-lock braking (ABS) and other slip control features to effectively brake the vehicle. Components of the brake system 150 may be housed in one or more blocks or housings. The block or housing may be made from solid material, such as aluminum, that has been drilled, machined, or otherwise formed to house the various components. Fluid conduits may also be formed in the block or housing.

The brake system 150 shown in FIG. 2 is provided for selectively actuating at least one of a pair of front wheel brakes and a pair of rear wheel brakes of a vehicle. A selected pair of the front wheel brakes and the rear wheel brakes is hydraulically actuated and an other pair of the front wheel brakes and the rear wheel brakes is electrically actuated. As shown in FIG. 2, the right rear wheel brake 152A and left rear wheel brake 152C are electrically actuated, and the left front wheel brake 152B and right front wheel brake 152D are hydraulically actuated. The brake system 150 has normal non-failure and backup braking modes. The brake system 150 has a reservoir 154 for storing hydraulic fluid and a deceleration signal transmitter 156.

The deceleration signal transmitter 156 includes a brake pedal 158 connected to a brake pedal unit 160 and selectively actuated by a driver of the vehicle to indicate a desired braking command. The brake pedal unit 160 has at least one brake sensor 162 (multiples shown at "T" in the Figures, for redundancy) for determining a position of the brake pedal 158 and responsively producing a braking signal corresponding to the desired braking command. The deceleration signal transmitter 156 is hydraulically isolated from at least the reservoir 110 and first and second power transmission units 108A and 108B of the depicted brake system 100.

The brake system 150 also includes at least one electronic control unit ("ECU") 164 (two shown). Each ECU 164A, 164B may include microprocessors and other electrical circuitry, and may be connected to either a dedicated or a shared (with the other ECU) power supply. Each ECU 164A, 164B receives various signals, processes signals, and controls the operation of various electrical components of the brake system 150 in response to the received signals. Each ECU 164A, 164B can be connected to various sensors of the brake system 150 such as reservoir fluid level sensors, pressure sensors (shown schematically at "P" in the Figures), travel sensors, switches, wheel speed sensors, and/or steering angle sensors. Each ECU 164A, 164B may also be connected to an external module (not shown) for receiving information related to yaw rate, lateral acceleration, longitudinal acceleration of the vehicle, or other characteristics of vehicle operation for any reason, such as, but not limited to, controlling the brake system 150 during vehicle braking, stability operation, or other modes of operation. Additionally, each ECU 164A, 164B may be connected to the instrument cluster for collecting and supplying information related to warning indicators such as an ABS warning light, a brake fluid level warning light, and a traction control/vehicle stability control indicator light.

The brake system 150 of FIG. 2 is of the "diagonal split" type, wherein a first brake pressure circuit (schematically shown by dashed line "A") provides hydraulic power and control to the left front wheel brake 152B, and electric power and control to the right rear wheel brake 102C (which is of a wholly electric type). Likewise, the second brake pressure circuit (schematically shown by dashed line "B") provides hydraulic power and control to the right front wheel brake 152A and electric power and control to the left rear wheel brake 152B. A pair of brake motors 166A, 166C are provided for electrically actuating respective left and right rear wheel brakes 152A, 152C.

A first power transmission unit 168 is in fluid communication with the reservoir 154, a selected one of the hydraulically actuated wheel brakes (one of the front brakes 152B, 152D in the brake system 150 of FIG. 2), and a second fluid separator 100B corresponding to an other one of the hydraulically actuated wheel brakes (the other of the front brakes 152B, 152D in the brake system 150 of FIG. 2). The first power transmission unit 168 is configured to selectively generate pressurized hydraulic fluid for actuating the selected one of the hydraulically actuated wheel brakes 152B, 152D during a normal non-failure braking mode and the other one of the hydraulically actuated wheel brakes 152B, 152D, via the second fluid separator 100, during a backup braking mode as mentioned previously.

The first electronic control unit 164A is configured to control the first power transmission unit 168A and a selected one of the electrically actuated wheel brakes 152A, 152C, on a contralateral side of the vehicle from the selected one of the hydraulically actuated wheel brakes 152B, 152D which is actuated by the first power transmission unit 164A in the normal non-failure braking mode. For example, and as shown in FIG. 2, the first electronic control unit 164A may hydraulically control the left front wheel brake 152B (via the first power transmission unit 164A) and electrically control the right rear wheel brake 152A. Through such a "diagonal" system, failure of the first power transmission unit 164A is less likely to result in loss of both brakes on a single side of the vehicle.

The second power transmission unit 168B is in fluid communication with the reservoir 154, the other one of the hydraulically actuated wheel brakes 152B, 152D (that is, the other one from that which is actuated in normal non-failure mode by the first power transmission unit 168A via the first power transmission unit 168A), and a first fluid separator 100A corresponding to the selected one of the hydraulically actuated wheel brakes 152B, 152D (that is, the one which is actuated in normal non-failure mode by the first power transmission unit 168A via the first power transmission unit 168A). The second power transmission unit 168B is configured to selectively generate pressurized hydraulic fluid for actuating the other one of the hydraulically actuated wheel brakes (152D, as shown in FIG. 2) during a normal non-failure braking mode and the selected one of the hydraulically actuated wheel brakes (152B, as shown in FIG. 2), via the first fluid separator 100A, during a backup braking mode.

The second electronic control unit 164B is configured to control the second power transmission unit 168B and a selected one of the electrically actuated wheel brakes 152A, 152C, on a contralateral side of the vehicle from the other one of the hydraulically actuated wheel brakes 152B, 152D which is actuated by the second power transmission unit 164B in the normal non-failure braking mode. For example, and as shown in FIG. 2, the second electronic control unit 164B may hydraulically control the right front wheel brake 152D (via the second power transmission unit 164B) and electrically control the left rear wheel brake 152C. Through such a "diagonal" system, failure of the second power transmission unit 168B is less likely to result in loss of both brakes on a single side of the vehicle.

At least one of the first and second power transmission units 168A, 168B may include a single acting plunger unit configured to selectively generate the pressurized hydraulic fluid for actuating a corresponding hydraulically actuated wheel brake 152B, 152D. At least one of the first and second power transmission units 168A, 168B could also or instead include a dual acting plunger unit, a ball screw unit, a pulley-motor unit, a rack-and-pinion unit, and/or any other desired component for selectively generating pressurized hydraulic fluid for a particular use environment.

Stated differently, each electrically powered brake includes a rear brake motor 166A, 166C which is controlled by a corresponding one of the first and second electronic control units 164A, 164B that controls the contralateral front wheel brake 152B, 152D. It should be noted that, whenever a wheel brake 152 is shown or described herein as being only electrically powered, or as not having a hydraulic connection to other hydraulic components of the brake system 150, that wheel brake 152 will be of an electromechanical type, whether or not an electrical brake (not shown) is provided to any other wheels of the same brake system 150.

A control valve 170A, 170B is provided to each of the first and second brake pressure circuits, and is hydraulically interposed between the reservoir 154 and a respective first or second power transmission unit 168A or 168B. It is contemplated that the first power transmission unit 168A and the first control valve 170A may be packaged together, and spaced apart from, the second power transmission unit 168B and the second control valve 170B—which may, likewise, be packaged together. This differential placement may be provided for any reason, such as, but not limited to, space or weight savings, packaging flexibility, and ease of manufacture. The control valves 170A, 170B, when present, may be venting valves which are normally de-energized, but then energized closed during a normal non-failure braking action.

First and second backup valves 172A, 172B are provided to each of the first and second brake pressure circuits, respectively, and are hydraulically interposed between a respective first or second power transmission unit 168A or 168B and a second fluid passage 112 of a respective second or first fluid separator 100B, 100A. The first and second backup valves 172A, 172B may be left de-energized (in a normally-open condition) when sensed pressure in the brake system 150 is within a predetermined normal pressure range (indicating a normal non-failure braking mode). When sensed pressure at a predetermined location in the brake system 150 is outside a normal range, at least one of the first and second backup valves 172A, 172B may be left open (de-energized) so that both front brakes 152B, 152D can still be applied. At least one of the first and second backup valves 172A, 172B is configured to selectively provide hydraulic fluid through the second fluid passage 112 of the respective fluid separator 100A, 100B to control sensed pressure to a predetermined slip control level.

When hydraulic fluid is provided, from any desired source, through the second fluid passage 112 of the respective fluid separator 100A, 100B the piston 118 of the fluid separator is pushed by pressure from the hydraulic fluid away from the second bore end 108 by overcoming the biasing spring 120 force. This movement of the piston 118 will pressurize the first fluid passage 110 and the attached hydraulically actuated wheel brake 152B, 152D in a backup mode, as previously discussed. Through use of the depicted arrangement of components, it is contemplated that three of the wheel brakes will still be available even in the backup braking mode following failure of one of the power transmission units 168 and/or its corresponding electronic control unit 164.

The braking signal from the deceleration signal transmitter 156 is transmitted, in a wired or wireless manner, to at least one of the first and second electronic control units 164A, 164B. At least one of the first and second electronic control units 164A, 164B controls at least one of a respective power transmission unit 168A, 168B, a respective fluid separator 100A, 100B, and a respective one of the electrically actuated wheel brakes 152A, 152C (via brake motor 166A, 166C) responsive to the braking signal.

Figure 3:
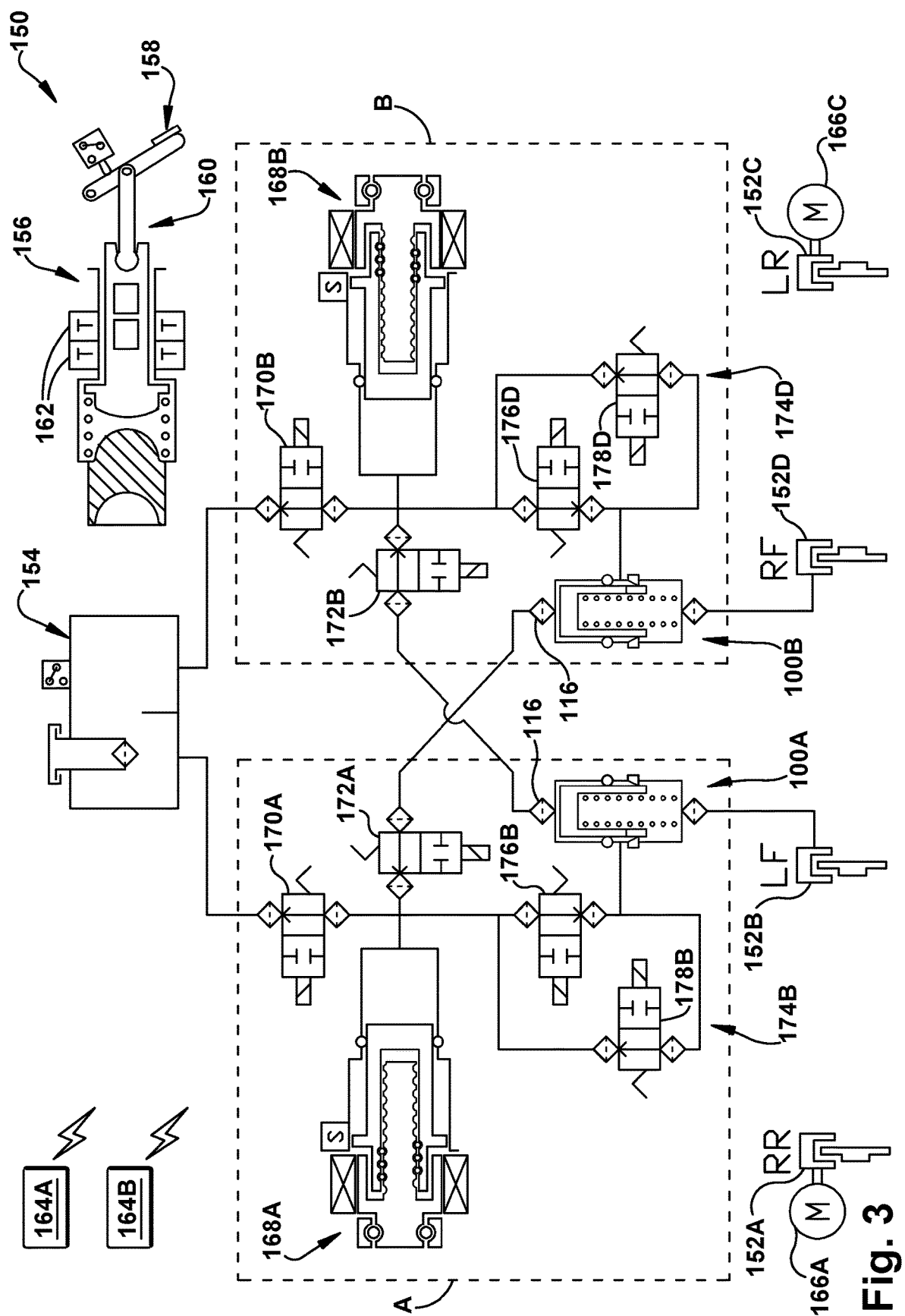
FIG. 3 is a schematic hydraulic diagram of a second brake system including the component of FIG. 1.

With reference now to FIG. 3, a second configuration of the brake system 150 is depicted, parts or all of which can be used with other components of the present invention, as desired. Description of similar components and operation which is made elsewhere in this application will not necessarily be repeated for each and every described configuration or aspect of the brake system 150, for brevity, but should instead be considered to apply to like-numbered portions of other configurations as appropriate.

The brake system 150 of FIG. 3 is similar in concept to the brake system shown in FIG. 8 of the '288 application, with the addition of first and second fluid separators 100A, 100B, for operation as described elsewhere herein. The brake system 150 of FIG. 3 is configured to provide independent pressure control of the front brakes 152B, 152D even after a failure of at least one power transmission unit 168A, 168B, in a multiplexed manner.

The brake system 150 of FIG. 3 therefore includes multiplexed control of the hydraulically actuated pair of wheel brakes 152B, 152D, similar to the multiplexed control disclosed in the '288 application. A first multiplex control valve arrangement 174B is interposed hydraulically between the first power transmission unit 168A and the first fluid separator 100A. A second multiplex control valve arrangement 174D is interposed hydraulically between the second power transmission unit 168B and the second fluid separator 100B. The first and second multiplex control valve arrangements 174B, 174D each are controlled by a corresponding first or second electronic control unit 164A or 164B. The first and second multiplex control valve arrangements 174B, 174D each include respective first and second multiplex valves 176 and 178, respectively. Combined with the first and second multiplex control valve arrangements 174B, 174D in certain configurations of the brake system 150, desirable spike apply response and slip control modulation properties could be achieved through use of the components shown and described herein, and may readily be provided by one of ordinary skill in the art for a particular use environment of the brake system 150.

Figure 4:
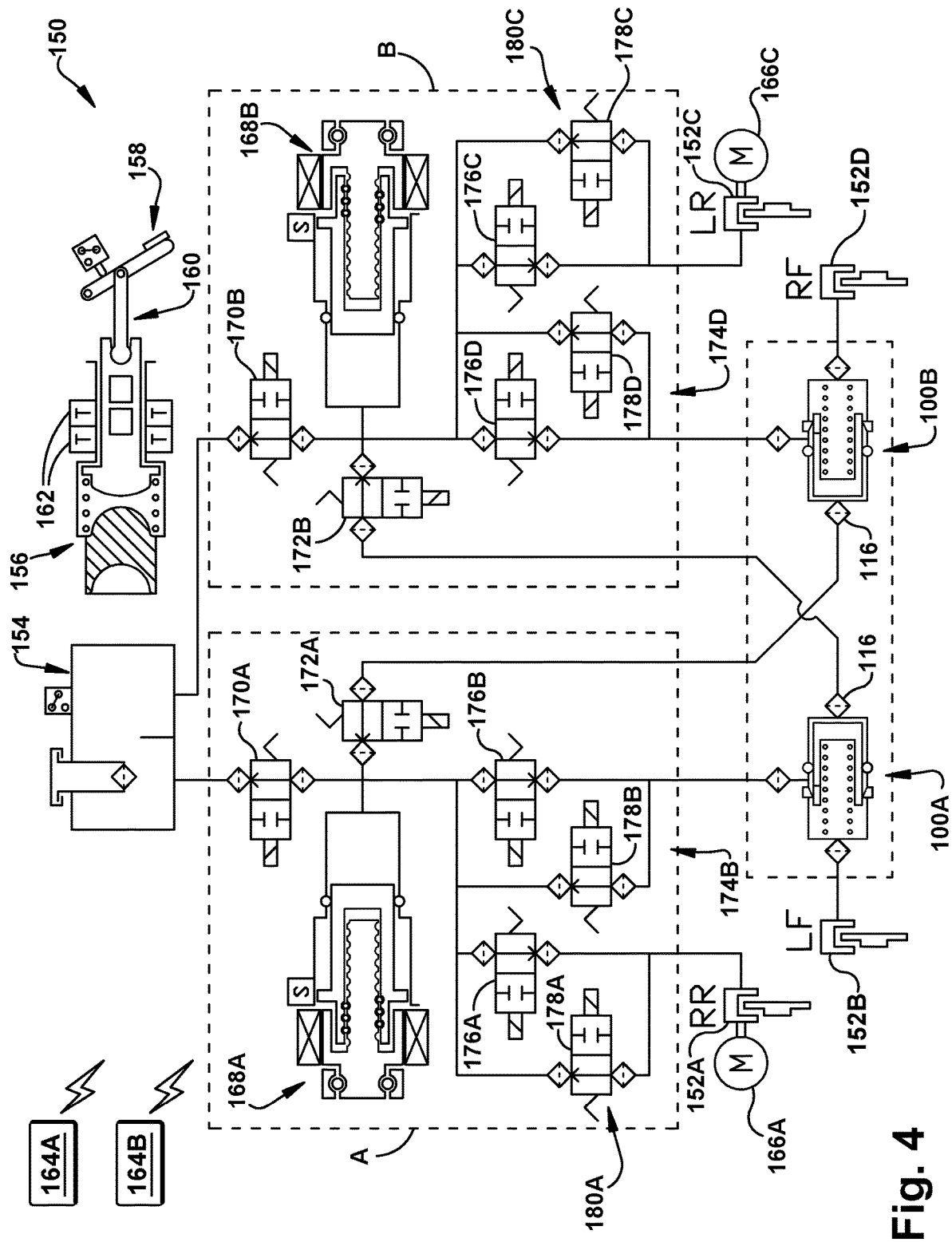
FIG. 4 is a schematic hydraulic diagram of a third brake system including the component of FIG. 1.

With reference now to FIG. 4, a third configuration of the brake system 150 is depicted, parts or all of which can be used with other components of the present invention, as desired. Description of similar components and operation which is made elsewhere in this application will not necessarily be repeated for each and every described configuration or aspect of the brake system 150, for brevity, but should instead be considered to apply to like-numbered portions of other configurations as appropriate.

The brake system 150 of FIG. 4 is similar in concept to the brake system shown in FIG. 2 of the '288 application, with the addition of first and second fluid separators 100A, 100B, for operation as described elsewhere herein. In the brake system 150 of FIG. 4, braking at all four wheels can be maintained after failure of one power transmission unit 168A, 168B. Although the fluid separators 100A, 100B of FIG. 4 are shown as packaged in a separate "block" (dashed line) from the first and second brake pressure circuits A and B, it is contemplated that one or more of the fluid separators 100A, 100B could instead be co-located with and/or integrated into a corresponding first or second brake pressure circuit A or B, as desired.

In the brake system 150 shown in FIG. 4, a selected pair of the front wheel brakes and the rear wheel brakes is hydraulically actuated (here, the front wheel brakes 152B, 152D) and an other pair of the front wheel brakes and the rear wheel brakes is selectively electrically and/or hydraulically actuated (here, the rear wheel brakes 152A, 152C). The rear brake motors 166A, 166C will be used to provide a backup and/or parking brake feature in many use environments of the brake system 150, with the rear wheel brakes 152A, 152C being used in a hydraulically operated mode as service brakes. For redundancy in the backup braking mode, the brake motor 166 for a selected electrically and/or hydraulically actuated brake 152 may be controlled by the contralateral electronic control unit 164 from that which controls the hydraulic fluid to the same brake 152 during normal non-failure operation. As is shown in FIG. 4, the rear wheel brakes 152A, 152C have electric backup and thus are not also provided with fluid separator 100 backup (from the contralateral power transmission unit 168), though it is contemplated that fluid separators (not shown), and the attendant backup function, could be provided to the electrically and/or hydraulically actuated brakes 152, as well.

As shown in FIG. 4, a first EH multiplex control valve arrangement 180A is interposed hydraulically between the first power transmission unit 168A and a selected one (here, right rear wheel brake 152A) of the selectively electrically and/or hydraulically actuated wheel brakes. The first electronic control unit 164A is configured to control the first power transmission unit 168A, the first multiplex control valve arrangement 174B (corresponding to the left front wheel brake 152B), and the first EH multiplex control valve arrangement 180A, responsive to a brake signal from the deceleration signal transmitter 156.

Also as shown in FIG. 4, a second EH multiplex control valve arrangement 180C is interposed hydraulically between the second power transmission unit 168B and an other one (here, left rear wheel brake 152C) of the selectively electrically and/or hydraulically actuated wheel brakes. The second electronic control unit 164B is configured to control the second power transmission unit 168B, the second multiplex control valve arrangement 174D (corresponding to the right front wheel brake 152D), and the second EH multiplex control valve arrangement 180C, responsive to a brake signal from the deceleration signal transmitter 156. The first and second EH multiplex control valve arrangements 180A, 180C each include respective first and second multiplex valves 176 and 178.

It is contemplated that, for arrangements of a brake system 150 in which multiplex control of the selectively electrically and/or hydraulically actuated wheel brakes 152 is not desired, one of ordinary skill in the art could provide a suitable "straight" hydraulic arrangement to facilitate transfer from a power transmission unit 168 to a respective selectively electrically and/or hydraulically actuated wheel brake 152, for a particular use environment.

Figure 5:
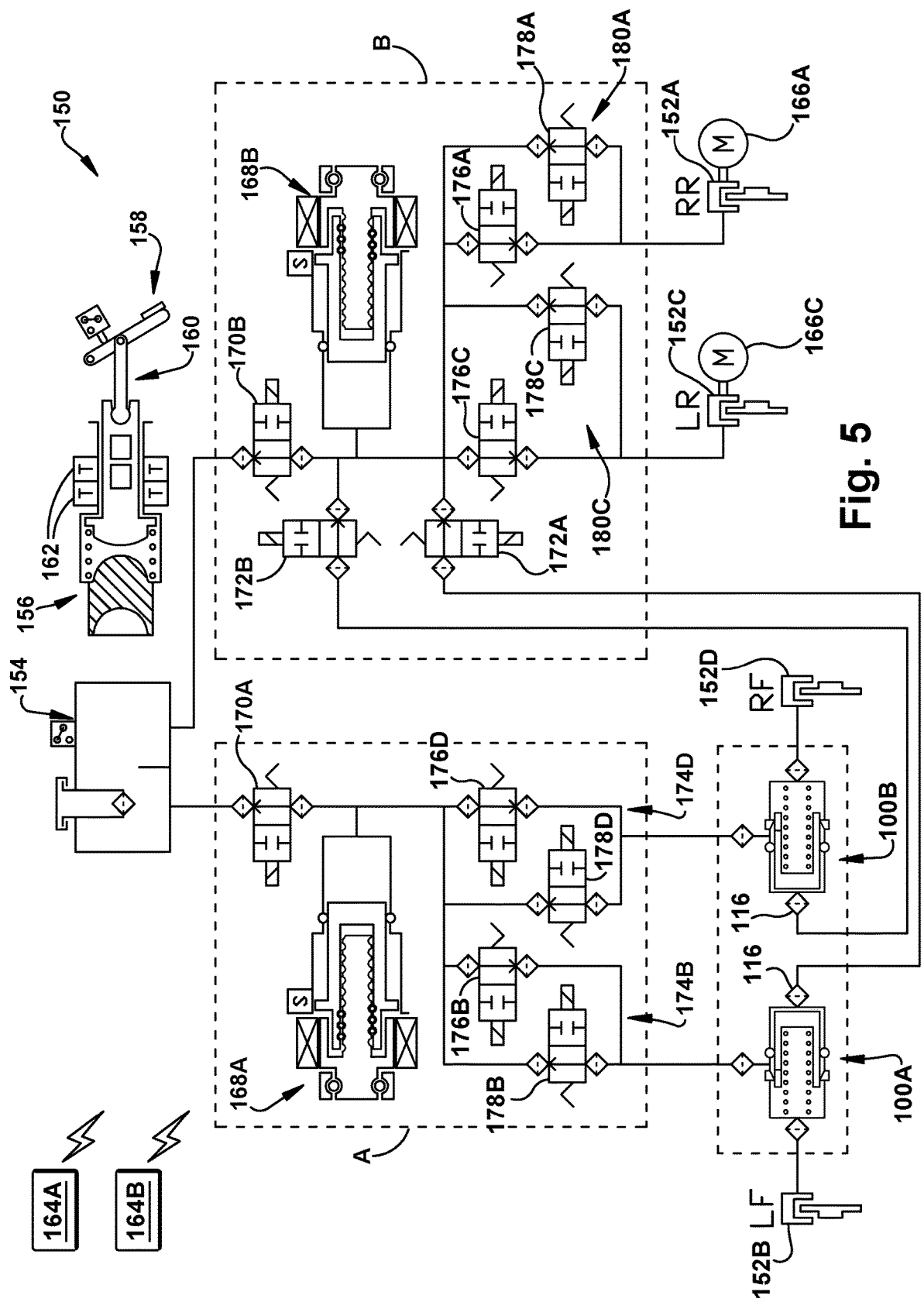
FIG. 5 is a schematic hydraulic diagram of a fourth brake system including the component of FIG. 1.

With reference now to FIG. 5, a fourth configuration of the brake system 150 is depicted, parts or all of which can be used with other components of the present invention, as desired. Description of similar components and operation which is made elsewhere in this application will not necessarily be repeated for each and every described configuration or aspect of the brake system 150, for brevity, but should instead be considered to apply to like-numbered portions of other configurations as appropriate.

The brake system 150 of FIG. 5 is similar in concept to the "diagonal split" brake system shown in FIG. 4 and discussed above, but rearranged into a "vertical split" such that the first power transmission unit 168A provides (multiplexed) hydraulic fluid to both of the front brakes 152B, 152D in a normal non-failure braking mode, and the second power transmission unit 168B provides (multiplexed) hydraulic fluid to both of the rear brakes 152A, 152C in a normal non-failure braking mode. In case of failure of the first power transmission unit 168A (or other lack of hydraulic fluid through the multiplex control valve arrangements 174B, 174D), then the backup valves 172A, 172B will be actuated to permit hydraulic fluid flow in the backup braking mode from the second power transmission unit 168B to the front brakes 152B, 152D via the fluid separators 100A, 100B. Should the second power transmission unit 168B (or other related components) fail and cease to provide pressurized hydraulic fluid to the rear brakes 152A, 152C, then the rear brake motors 166A, 166C may be actuated by one or both of the first and second electronic control units 164A, 164B to provide braking force electro-mechanically to the rear brakes 152A, 152C. In many use environments of the brake system 150 of FIG. 5, the rear brake motors 166A, 166C will be controlled by the same one of the first and second electronic control units 1564A, 164B that controls the first power transmission unit 168A corresponding to the front brakes 152B, 152D, for backup purposes.

Figure 6:
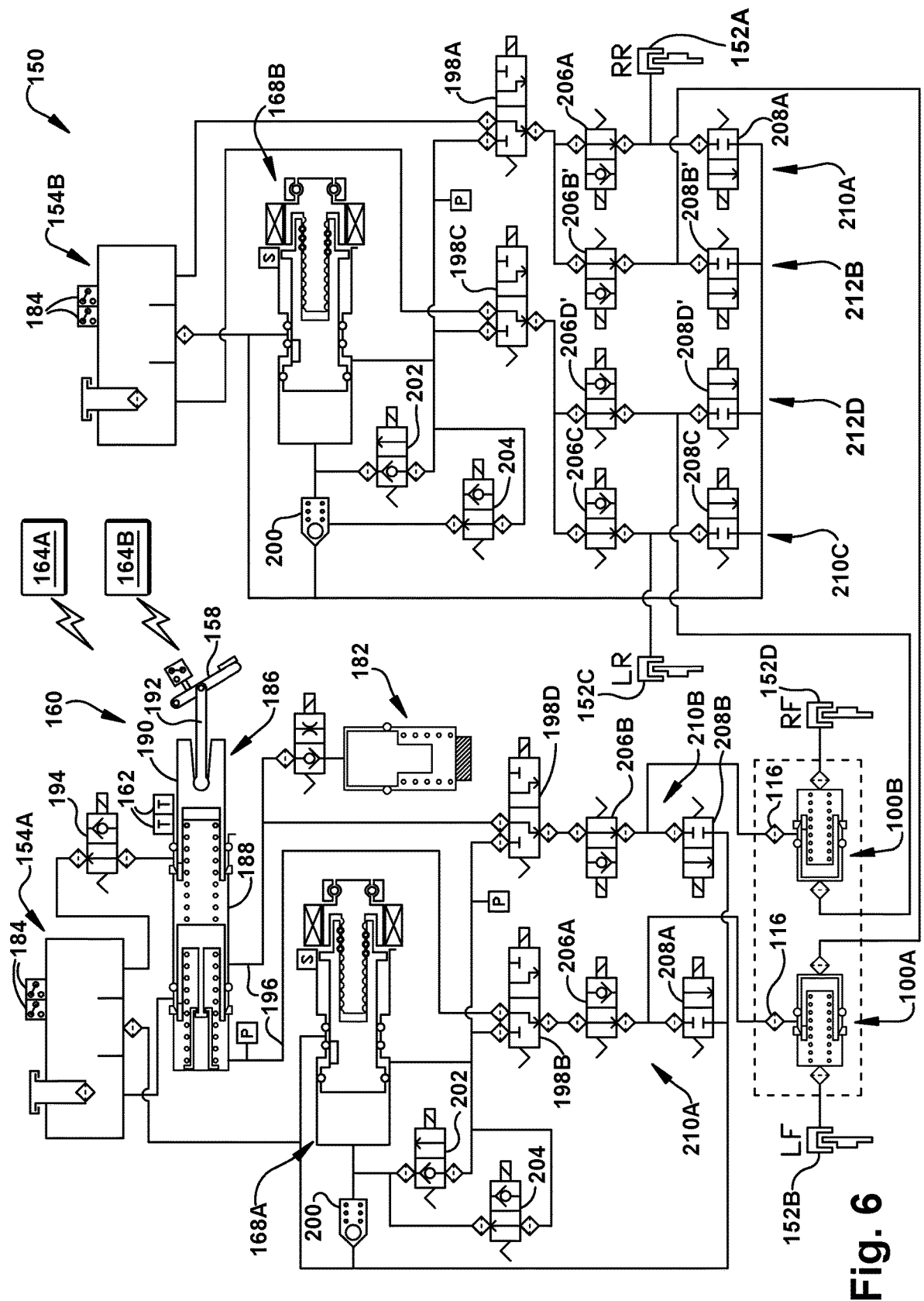
FIG. 6 is a schematic hydraulic diagram of a fifth brake system including the component of FIG. 1.

Turning to FIG. 6, a fifth configuration of the brake system 150 is depicted, parts or all of which can be used with other components of the present invention, as desired. Description of similar components and operation which is made elsewhere in this application will not necessarily be repeated for each and every described configuration or aspect of the brake system 150, for brevity, but should instead be considered to apply to like-numbered portions of other configurations as appropriate.

The brake system 150 of FIG. 6 includes similar components and arrangements to those of copending U.S. patent application Ser. No. 17/188,363, filed 1 Mar. 2021 and titled "Apparatus and Method for Control of a Hydraulic Brake System" and to copending U.S. patent application Ser. No. 17/400,178, filed concurrently herewith and titled "Brake System with Plunger-Based Secondary Brake Module", the entire contents of both of which are incorporated herein by reference.

In FIG. 6, a manual pushthrough type brake system 150 is provided for hydraulically actuating a pair of front wheel brakes. The brake system 150 has normal non-failure and backup braking modes. Unlike the brake systems 150 of FIGS. 2-5, the brake system 150 of FIG. 6 does not include electrically actuated motors, but instead has iso/dump type hydraulic control of both the pair of front brakes and the pair of rear brakes 152.

In the illustrated embodiment of the brake system 150 of FIG. 6, there are four wheel brakes 152A, 152B, 152C, and 152D. The wheel brakes 152A, 152B, 152C, and 152D can have any suitable wheel brake structure operated by the application of pressurized brake fluid. Each of the wheel brakes 152A, 152B, 152C, and 152D may include, for example, a brake caliper mounted on the vehicle to engage a frictional element (such as a brake disc) that rotates with a vehicle wheel to effect braking of the associated vehicle wheel. The wheel brakes 152A, 152B, 152C, and 152D can be associated with any combination of front and rear wheels of the vehicle in which the brake system 150 is installed. For example, the brake system 150 may be configured as a front/rear or "vertical split" system, as shown, such that the first power transmission unit 168A is configured for selectively providing pressurized hydraulic fluid for actuating at least a selected one of the pair of front wheel brakes 152B and 152D, in a non-failure normal braking mode, as will be discussed below.

The second power transmission unit 168B is configured for selectively providing pressurized hydraulic fluid for actuating a chosen pair of brakes 152 (here, the pair of front wheel brakes 152B and 152D) via the first and second fluid separators 100A, 100B, when the brake system 150 is in a backup braking mode, and the other pair of brakes 152 (here, the rear wheel brakes 152A and 152C), when the brake system 150 is in a normal non-failure braking mode. A second reservoir 154B is provided to supply hydraulic fluid to the second power transmission unit 168B. The first electronic control unit 164A controls at least one of the first and second power transmission units. A second electronic control unit 164B may be provided. When the second electronic control unit 164B is present, and as will be presumed in the below description of FIG. 6, the first electronic control unit 164A controls the first power transmission unit 168A, and the second electronic control unit 164B controls the second power transmission unit 168B.

As shown in all of the Figures, the wheel brake 152A may be associated with a right rear wheel of the vehicle in which the brake system 150 is installed, and the wheel brake 152B may be associated with the left front wheel. The wheel brake 152C may be associated with the left rear wheel, and the wheel brake 152D may be associated with the right front wheel.

The brake system 150 also includes a brake pedal unit, indicated generally at 160, a pedal simulator, indicated generally at 182, and the aforementioned first and second reservoirs 154A, 154B.

The reservoirs 154A, 154B store and hold hydraulic fluid for the brake system 150. The fluid within the first and second reservoirs 154A, 154B is preferably held at or about atmospheric pressure, but the fluid may be stored at other pressures if desired. The first and second reservoirs 154A, 154B are shown schematically as each having three tanks or sections with fluid conduit lines connected thereto. The sections can be separated by several interior walls within the first and second reservoirs 154A, 154B and are provided to prevent complete drainage of first and second reservoirs 154A, 154B in case one of the sections is depleted due to a leakage via one of the three lines connected to the first and second reservoirs 154A, 154B. Alternatively, the first and second reservoirs 154A, 154B may include multiple separate housings. The first and second reservoirs 154A, 154B may each include at least one fluid level sensor 184 (two shown on each reservoir, for redundancy) for detecting the fluid level of one or more of the sections of the first and second reservoirs 154A, 154B.

The first and second power transmission units 168A, 168B of the brake system 150 function as a source of pressure to provide a desired pressure level to respective ones of the hydraulically operated wheel brakes 152A, 152B, 152C, and 152D during a typical or normal brake apply. After a brake apply, fluid from the wheel brakes 152A, 152B, 152C, and 152D may be returned to the respective power transmission unit 168A or 168B and/or be diverted to the respective reservoir 154A, 154B. In FIG. 6, the first and second power transmission units 168A, 168B are shown as being dual acting plunger type power transmission unit, though single acting plunger or any other desired type of controllable hydraulic fluid pressurizer could be also or instead provided to the brake system 150. It is also contemplated that other configurations (not shown) of the brake system 150 could include hydraulic control of just a selected one of the pair of front wheel brakes 152B, 152D and the pair of rear wheel brakes 152A, 152C (with the other pair being electrically controlled/actuated). One of ordinary skill in the art would be readily able to provide such an arrangement for a desired use environment, following aspects of the present invention.

The second power transmission unit 168B of the brake system 150 functions as a source of pressure to provide a desired pressure level to the pair of front wheel brakes 152B and 152D in a backup or "failed" situation, when, for some reason, the first power transmission unit 168A is unable to provide fluid to those selected wheel brakes.

As shown schematically in FIG. 6, the brake pedal unit 160 includes a master cylinder 186 with a housing 188 defining a longitudinally extending bore for slidably receiving various cylindrical pistons and other components therein. Examples of such components are the first and second springs longitudinally extending in series within the bore, as shown in the Figures. Note that the housing 188 is not specifically schematically shown in the Figures, but instead the walls of the longitudinally extending bore are schematically illustrated. The housing 188 may be formed as a single unit or include two or more separately formed portions coupled together. For some use environments, the master cylinder 186 may be of a tandem master cylinder type.

An MC primary piston 190 is connected with a brake pedal 158 via a linkage arm 192. Leftward movement of the MC primary piston 190 may cause, under certain conditions, a pressure increase within the master cylinder 186.

The pedal simulator 182 is in selective fluid communication with the master cylinder 186 for providing predetermined brake pedal response. As shown, the pedal simulator 182 is connected to the master cylinder 186 via one or more hydraulic passages, but it is contemplated that the "selective fluid communication" could be provided via integration of the pedal simulator 182 into the master cylinder 186.

The brake system 150 may further include an optional solenoid actuated simulator test valve 194 which may be electronically controlled between an open position and a powered closed position and be located fluidly between the first reservoir 154A and the master cylinder 186.

The brake pedal unit 160 is connected to the brake pedal 158 and is actuated by the driver of the vehicle as the driver presses on the brake pedal 158. A brake sensor or switch may be electrically connected to the ECUs 164A, 164B to provide a brake signal indicating a depression of the brake pedal 158. That is, the master cylinder 186 is operable to provide a brake signal responsive to actuation of the brake pedal 158 connected thereto.

The brake pedal unit 160 may be used as a back-up source of pressurized fluid to essentially replace the normally supplied source of pressurized fluid from the first power transmission unit 168A under certain failed conditions of the brake system 150, and/or upon initial startup of the brake system 150. This situation is referred to as a manual push-through event, or a "manual apply".

In such a push-through mode, the brake pedal unit 160 can supply pressurized fluid to a master cylinder output 196 (including dual fluid passages in the embodiment of FIG. 6), which is then routed to the front wheel brakes 152B, 152D as desired. This flow is pushed through, largely under mechanical pressure upon the brake pedal 158 from the driver's foot, from the master cylinder 186. That is, the master cylinder 186 is selectively operable during a manual push-through mode by actuation of the brake pedal 158 connected to the master cylinder 186 to generate brake actuating pressure at a master cylinder output 196 for hydraulically actuating at least one of the pair of front wheel brakes 152B, 152D and the pair of rear wheel brakes 152A, 102C (hydraulically actuating the pair of front wheel brakes 152B, 152D, as shown in FIG. 6

In summary, the master cylinder 186 is fluidly connected to the first reservoir 154A and is operable to provide a brake signal responsive to actuation of a brake pedal 158 connected thereto. The first power transmission unit 168A is in fluid communication with the master cylinder 186 and the first reservoir 154A. The second power transmission unit 168B is in fluid communication with the second reservoir 154B.

First and second two-position three-way valves 198B and 198D, respectively, are provided to the brake system 150 as shown in the FIG. 6. Each of the first and second three-way valves 198B and 198D is hydraulically connected with the master cylinder 186, the first power transmission unit 168A, and a corresponding wheel brake 152 of the pair of wheel brakes actuated by the first power transmission unit 168A in the normal non-failure mode. The first and second three-way valves 198B and 198D selectively control hydraulic fluid flow from a chosen one of the master cylinder 186 and the first power transmission unit 168A to the corresponding front wheel brakes 152B and 152D. Through use of the first and second three-way valves 198B and 198D, hydraulic fluid can be routed to the corresponding wheel brakes 152B, 152D in a desired manner (from either the master cylinder 186 or the first power transmission unit 168A) to assist with boosted braking control and provide desired response times and efficient pressure flow to the respective wheel brakes 152 associated with each three-way valve.

FIG. 6 also depicts a replenishing check valve 200, which is located fluidically between the first reservoir 154A and the first power transmission unit 168A. When present, the replenishing check valve 200 may be provided to assist with refilling of the first power transmission unit 168A (or components thereof) under predetermined conditions. For example, the replenishing check valve 200 may help to facilitate refilling of the chamber in front of the DAP head when a DAP-type first power transmission unit 168A is building pressure during its retraction stroke by pushing fluid out of the annular chamber behind the DAP head. This is done, for example, during slip control if additional flow to the brakes is needed after the DAP is stroked fully forward. Another replenishing check valve 200 is likewise associated with the second power transmission unit 168B, for similar operation.

A normally closed dual-acting plunger ("DAP") valve 202 and a normally open DAP valve 204 are interposed hydraulically between the primary power transmission unit 104 and at least one of the first and second three-way valves 198B and 198D. Additional normally closed and normally open DAP valves are likewise associated with the second power transmission unit 168B, for similar operation.

Fluid control of each of the pairs of front and rear wheel brakes 152B, 152D and 152A, 152C may be provided by an arrangement of iso and dump valves 206 and 208, referenced collectively as ABS modulator arrangements 210.

Here, for clarity in FIG. 6, the iso and dump valves 206 and 208 are appended with the letter "B" or "D", referencing a respective front wheel brake 152B and 152D, or the letter "A" or "C", referencing a respective rear wheel brake 152A and 152C, with which the so-labeled valves are respectively associated. A chosen one of the iso and dump valves 206 and 208 receives input from an output of the other one of the iso and dump valves 206 and 208.

The iso/dump type fluid control facilitated by the ABS modulator arrangement 210 selectively provides, for example, slip control or traction compensation to at least one of the wheel brakes 152. In summary, at least a portion of the ABS modulator arrangement 210 for each wheel brake 152 is hydraulically interposed between at least one of the first and second three-way valves 198 and at least a selected wheel brake 152 of the pair of front wheel brakes 152B, 152D and the pair of rear wheel brakes 152A, 152C.

With reference now to the right "half" of FIG. 2, and the portions of the brake system drawing fluid from the second reservoir 154B, third and fourth two-position three-way valves 198A and 198C are each hydraulically connected with the second reservoir 154B, the second power transmission unit 168B, and a corresponding brake 152A, 152C of the other one of the pair of front wheel brakes and the pair of rear wheel brakes. The third and fourth three-way valves 198A and 198C selectively control hydraulic fluid flow from a chosen one of the second reservoir 154B and the second power transmission unit 168B to the corresponding brake 152A or 152C of the other one of the pair of front wheel brakes and the pair of rear wheel brakes (that is, the "other pair" which is not actuated during normal non-failure braking by fluid flowing through the first and second three-way valves 198B and 198D. It should be noted that, due to the absence of a master cylinder 186 and/or brake pedal unit 160 associated directly with the second power transmission unit 168B, manual push-through is not provided in the brake system 150 of FIG. 6 for the pair of rear wheel brakes 152A and 152C.

An ABS modulator arrangement 210A, 201C is hydraulically interposed between each of the third and fourth three-way valves 198A, 198C and the corresponding brake (here, rear brakes 152A, 152C) of the other one of the pair of front wheel brakes and the pair of rear wheel brakes. The ABS modulator arrangements 210A, 210C associated with the second power transmission unit 168B operate analogously to the ABS modulator arrangements 210B, 210D associated with the first power transmission unit 168A, for their corresponding wheel brakes 152.

The brake system 150 shown in FIG. 6 also includes backup ABS modulator arrangements 212B, 212D hydraulically interposed between each of the third and fourth three-way valves 198C, 198A (respectively) and a corresponding brake 152B, 152D of the selected one of the pair of front wheel brakes and the pair of rear wheel brakes which is associated with the first power transmission unit 168A. The first and second fluid separators 100A, 100B are each hydraulically interposed between a backup ABS modulator arrangement 212B, 212D and the corresponding brake 152B, 152D of the selected one of the pair of front wheel brakes and the pair of rear wheel brakes which is associated with the first power transmission unit 168A.

The backup ABS modulator arrangements 212B, 212D, may include iso valves 206B', 206D' and dump valves 208B', 208D', for providing desired iso/dump fluid control features and performance to the associated front wheel brakes 152B, 152D, even in the backup braking mode where fluid is supplied to the front wheel brakes 152B, 152D by the second power transmission unit 168B through action of the respective first and second fluid separators 100A, 100B. This backup braking mode is facilitated by the first and second fluid separators 100A, 100B as described in detail above.

Using the arrangement of valves in FIG. 6, the fluid pressures at each of the wheel brakes 152 can be controlled independently from one another during normal, non-failure operation and in a backup braking mode.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A fluid separator configured for inclusion in a brake system having normal non-failure and backup braking modes, the fluid separator comprising:
 a separator housing defining a longitudinal bore having first and second longitudinally separated bore ends;
 a first fluid passage extending through the housing in fluid communication with the bore at the first bore end;
 a second fluid passage extending through the housing in fluid communication with the bore adjacent the second bore end;
 a third fluid passage extending through the housing in fluid communication with a portion of the bore spaced apart from both the first and second bore ends;
 a free-floating piston located inside the bore and configured for longitudinal movement with respect to the bore responsive to fluid pressure within the bore;
 a biasing spring urging the piston toward the second bore end; and
 an end cap located at the second bore end, the end cap being maintained on the housing via at least two retainers;
 wherein, when the brake system is in the normal non-failure braking mode, a primary fluid route is defined between the first and third fluid passages through at least a portion of a body of the piston; and
 wherein, when the brake system is in the backup braking mode, the piston is urged toward the first bore end by fluid pressure from the second fluid passage to at least partially close the primary fluid route, travel of the piston toward the first bore end being operative to raise fluid pressure within the bore adjacent the first fluid passage and urge fluid out of the bore through the first fluid passage.

2. The fluid separator of claim 1, wherein at least one of the first, second, and third fluid passages includes an inline filter.

3. The fluid separator of claim 1, wherein a first retainer is a clinch of the end cap into engagement with the separator housing and a second retainer is a retention ring extending substantially about a circumference of the end cap to maintain the end cap in a predetermined relationship with the separator housing.

4. The fluid separator of claim 1, wherein the piston is of a cup-type including an internal piston cavity configured to receive a portion of the biasing spring therewithin, the piston including a skirt area substantially laterally surrounding a circumference of the biasing spring, the skirt area including a plurality of piston bores extending laterally through the body of the piston, the piston bores being configured to selectively place an interior portion of the skirt area in fluid communication therethrough with the third fluid passage responsive to a longitudinal position of the piston within the bore.

5. The fluid separator of claim 1, including a piston face located longitudinally adjacent the end cap and in fluid communication with the second fluid passage, fluid pressure from the second fluid passage against the piston face selectively urging the piston toward the first bore end against a spring force of the biasing spring.

6. The fluid separator of claim 5, wherein the piston face includes at least one standoff protrusion configured for selective contact with the end cap to maintain longitudinal spacing of at least an other portion of the piston face relative to the end cap.

7. The fluid separator of claim 1, wherein the bore defines a first seal groove longitudinally interposed between the third fluid passage and the first bore end, the first seal groove being configured to selectively receive a lip seal thereinto, the lip seal engaging with an outer surface of the piston to resist fluid communication therepast from the first fluid passage toward the third fluid passage.

8. The fluid separator of claim 1, wherein the bore defines a second seal groove longitudinally interposed between the third fluid passage and the second bore end, the second seal groove being configured to selectively receive a bidirectional seal thereinto, the bidirectional seal engaging with an outer surface of the piston to resist fluid communication between the first and second bore ends.

9. The fluid separator of claim 1, wherein the third fluid passage includes an annular fluid groove defined in the bore circumferentially around the piston, wherein fluid in the primary fluid route passes through at least one piston bore in the piston and through the annular fluid groove under fluid pressure from a chosen one of the first and third fluid passages.

10. The fluid separator of claim 1, wherein the bore includes at least one longitudinally extending relief slot in a wall thereof interposed between the first and third fluid passages, the relief slot permitting fluid flow therethrough when at least a portion of the piston is laterally adjacent the relief slot within the bore.

11. The fluid separator of claim 10, wherein a secondary fluid route is defined from the third fluid passage, through the relief slot, and to the first fluid passage when at least a portion of the piston is laterally adjacent the relief slot within the bore.

12. A brake system for selectively actuating at least one of a pair of front wheel brakes and a pair of rear wheel brakes of a vehicle, a selected pair of the front wheel brakes and the rear wheel brakes being hydraulically actuated and an other pair of the front wheel brakes and the rear wheel brakes being electrically actuated, the system having normal non-failure and backup braking modes, the system comprising:
   a reservoir;
   a pair of brake motors for selectively electrically actuating respective left and right wheel brakes of the pair of electrically actuated wheel brakes;
   a first power transmission unit, in fluid communication with the reservoir, a selected one of the hydraulically actuated wheel brakes, and a second fluid separator of claim 1 corresponding to an other one of the hydraulically actuated wheel brakes, the first power transmission unit being configured to selectively generate pressurized hydraulic fluid for actuating the selected one of the hydraulically actuated wheel brakes during a normal non-failure braking mode and the other one of the hydraulically actuated wheel brakes, via the second fluid separator, during a backup braking mode;
   a first electronic control unit configured to control the first power transmission unit and a selected one of the electrically actuated wheel brakes, on a contralateral side of the vehicle from the selected one of the hydraulically actuated wheel brakes which is actuated by the first power transmission unit in the normal non-failure braking mode;
   a second power transmission unit, in fluid communication with the reservoir, the other one of the hydraulically actuated wheel brakes, and a first fluid separator of claim 1 corresponding to the selected one of the hydraulically actuated wheel brakes, the second power transmission unit being configured to selectively generate pressurized hydraulic fluid for actuating the other one of the hydraulically actuated wheel brakes during a normal non-failure braking mode and the selected one of the hydraulically actuated wheel brakes, via the first fluid separator, during a backup braking mode; and
   a second electronic control unit configured to control the second power transmission unit and an other one of the electrically actuated wheel brakes, on a contralateral side of the vehicle from the other one of the hydraulically actuated wheel brakes which is actuated by the second power transmission unit in the normal non-failure braking mode.

13. The brake system of claim 12, including first and second backup valves hydraulically interposed between a respective first or second power transmission unit and a second fluid passage of a respective second or first fluid separator; the first and second backup valves being de-energized when sensed pressure in the brake system is within a predetermined normal pressure range and configured to selectively provide hydraulic fluid through the second fluid passage of the respective fluid separator to control sensed pressure to a predetermined slip control level.

14. The brake system of claim 12, wherein at least one of the first and second power transmission units includes a single acting plunger unit configured to selectively generate the pressurized hydraulic fluid for actuating a corresponding hydraulically actuated wheel brake.

15. The brake system of claim 12, including a deceleration signal transmitter including a brake pedal connected to a brake pedal unit and selectively actuated by a driver of the vehicle to indicate a desired braking command, the brake pedal unit having a brake sensor for determining a position of the brake pedal and responsively producing a braking signal corresponding to the desired braking command, the braking signal being transmitted to at least one of the first and second electronic control units, and the at least one of the first and second electronic control units controlling at least one of a respective power transmission unit, a respective fluid separator, and a respective one of the electrically actuated wheel brakes responsive to the braking signal.

16. The brake system of claim 15, wherein the braking signal is wirelessly transmitted to the at least one of the first and second electronic control units.

17. The brake system of claim 12, including a first multiplex control valve arrangement interposed hydraulically between the first power transmission unit and the first fluid separator and a second multiplex control valve arrangement interposed hydraulically between the second power transmission unit and the second fluid separator, the first and second multiplex control valve arrangements each being controlled by a corresponding first or second electronic control unit, and the first and second multiplex control valve arrangements each including respective first and second multiplex valves.

18. A brake system for selectively actuating at least one of a pair of front wheel brakes and a pair of rear wheel brakes of a vehicle, a selected pair of the front wheel brakes and the rear wheel brakes being hydraulically actuated and an other pair of the front wheel brakes and the rear wheel brakes being selectively electrically and/or hydraulically actuated, the system having normal non-failure and backup braking modes, the system comprising:
   a reservoir;
   a pair of brake motors for selectively electrically actuating respective left and right wheel brakes of the pair of selectively electrically and/or hydraulically actuated wheel brakes;
   a first power transmission unit, in fluid communication with the reservoir, a selected one of the hydraulically actuated wheel brakes, and a second fluid separator of claim 1 corresponding to an other one of the hydraulically actuated wheel brakes, the first power transmission unit being configured to selectively generate pressurized hydraulic fluid for actuating the selected one of the hydraulically actuated wheel brakes during a normal non-failure braking mode and the other one of the hydraulically actuated wheel brakes, via the second fluid separator, during a backup braking mode;
   a first multiplex control valve arrangement interposed hydraulically between the first power transmission unit and the first fluid separator;
   a second multiplex control valve arrangement interposed hydraulically between the second power transmission unit and the second fluid separator, the first and second multiplex control valve arrangements each including respective first and second multiplex valves;
   a first EH multiplex control valve arrangement interposed hydraulically between the first power transmission unit and a selected one of the selectively electrically and/or hydraulically actuated wheel brakes;
   a first electronic control unit configured to control the first power transmission unit, the first multiplex control valve arrangement, and the first EH multiplex control valve arrangement;

a second power transmission unit, in fluid communication with the reservoir, the other one of the hydraulically actuated wheel brakes, and a first fluid separator of claim 1 corresponding to the selected one of the hydraulically actuated wheel brakes, the second power transmission unit being configured to selectively generate pressurized hydraulic fluid for actuating the other one of the hydraulically actuated wheel brakes during a normal non-failure braking mode and the selected one of the hydraulically actuated wheel brakes, via the first fluid separator, during a backup braking mode;

a second EH multiplex control valve arrangement interposed hydraulically between the second power transmission unit and the other one of the selectively electrically and/or hydraulically actuated wheel brakes, the first and second EH multiplex control valve arrangements each including respective first and second multiplex valves; and a second electronic control unit configured to control the second power transmission unit, the second multiplex control valve arrangement, and the second EH multiplex control valve arrangement.

19. The brake system of claim 18, including a deceleration signal transmitter including a brake pedal connected to a brake pedal unit and selectively actuated by a driver of the vehicle to indicate a desired braking command, the brake pedal unit having a brake sensor for determining a position of the brake pedal and responsively producing a braking signal corresponding to the desired braking command, the braking signal being transmitted to at least one of the first and second electronic control units, and the at least one of the first and second electronic control units controlling at least one of a respective power transmission unit, a respective fluid separator, and a respective one of the selectively electrically and/or hydraulically actuated wheel brakes responsive to the braking signal.

20. The brake system of claim 18, wherein the first electronic control unit is configured to electrically control the brake motor of a selected one of the selectively electrically and/or hydraulically actuated wheel brakes, on a contralateral side of the vehicle from the selected one of the hydraulically actuated wheel brakes which is actuated by the first power transmission unit in the normal non-failure braking mode; and wherein the second electronic control unit is configured to electrically control the brake motor of an other one of the selectively electrically and/or hydraulically actuated wheel brakes, on a contralateral side of the vehicle from the other one of the hydraulically actuated wheel brakes which is actuated by the second power transmission unit.

21. A brake system for selectively actuating at least one of a pair of front wheel brakes and a pair of rear wheel brakes of a vehicle, a selected pair of the front wheel brakes and the rear wheel brakes being hydraulically actuated and an other pair of the front wheel brakes and the rear wheel brakes being selectively electrically and/or hydraulically actuated, the system having normal non-failure and backup braking modes, the system comprising:

a reservoir;

a pair of brake motors for selectively electrically actuating respective left and right wheel brakes of the pair of selectively electrically and/or hydraulically actuated wheel brakes;

a first power transmission unit, in fluid communication with the reservoir and a pair of multiplex control valve arrangements corresponding to each of the hydraulically actuated wheel brakes, the pair of multiplex control valve arrangements each including respective first and second multiplex valves, the first power transmission unit being configured to selectively generate pressurized hydraulic fluid for actuating the pair of hydraulically actuated wheel brakes during a normal non-failure braking mode;

a first electronic control unit configured to control the first power transmission unit, the pair of multiplex control valve arrangements, and the pair of brake motors corresponding to the pair of selectively electrically and/or hydraulically actuated wheel brakes;

a second power transmission unit, in fluid communication with the reservoir, first and second fluid separators of claim 1 corresponding to the pair of hydraulically actuated wheel brakes, and first and second EH multiple control valve arrangements interposed hydraulically between the second power transmission unit and respective ones of the pair of selectively electrically and/or hydraulically actuated wheel brakes, the first and second EH multiplex control valve arrangements each including respective first and second iso and dump valves, the second power transmission unit being configured to selectively generate pressurized hydraulic fluid for actuating the pair of selectively electrically and/or hydraulically actuated wheel brakes during a normal non-failure braking mode and the pair of hydraulically actuated wheel brakes, via the first and second fluid separators, during a backup braking mode; and a second electronic control unit configured to control the second power transmission unit and the first and second EH multiplex control valve arrangements.

22. The brake system of claim 21, including a deceleration signal transmitter including a brake pedal connected to a brake pedal unit and selectively actuated by a driver of the vehicle to indicate a desired braking command, the brake pedal unit having a brake sensor for determining a position of the brake pedal and responsively producing a braking signal corresponding to the desired braking command, the braking signal being transmitted to at least one of the first and second electronic control units, and the at least one of the first and second electronic control units controlling at least one of a respective power transmission unit, a respective fluid separator, and a respective one of the selectively electrically and/or hydraulically actuated wheel brakes responsive to the braking signal.

23. A brake system for hydraulically actuating a pair of front wheel brakes and a pair of rear wheel brakes, the system having normal non-failure and backup braking modes, the system comprising:

first and second reservoirs;

a master cylinder fluidly connected to the first reservoir and operable to provide a brake signal responsive to actuation of a brake pedal connected thereto, the master cylinder being selectively operable during a manual push-through mode by actuation of the brake pedal to generate brake actuating pressure at a master cylinder output for hydraulically actuating a selected one of the pair of front wheel brakes and the pair of rear wheel brakes;

a pedal simulator in selective fluid communication with the master cylinder for providing predetermined brake pedal response;

a first power transmission unit in fluid communication with the master cylinder and the first reservoir, the first power transmission unit being configured for selectively providing pressurized hydraulic fluid for actuating the selected one of the pair of front wheel brakes and the pair of rear wheel brakes in a non-failure normal braking mode;

a second power transmission unit in fluid communication with the second reservoir, the second power transmission unit being configured for selectively providing pressurized hydraulic fluid for actuating the selected one of the pair of front wheel brakes and the pair of rear wheel brakes in a backup braking mode, via first and second fluid separators of claim 1, and for actuating the other one of the pair of front wheel brakes and the pair of rear wheel brakes in a non-failure normal braking mode; and a first electronic control unit for controlling at least one of the first and second power transmission units.

24. The brake system of claim 23, wherein the first electronic control unit controls the first power transmission unit, and the brake system includes a second electronic control unit for controlling the second power transmission unit.

25. The brake system of claim 23, wherein first and second two-position three-way valves are each hydraulically connected with the master cylinder, the first power transmission unit, and a corresponding brake of the selected one of the pair of front wheel brakes and the pair of rear wheel brakes, the first and second three-way valves selectively controlling hydraulic fluid flow from a chosen one of the master cylinder and the first power transmission unit to the corresponding brake of the selected one of the pair of front wheel brakes and the pair of rear wheel brakes; and an ABS modulator arrangement is hydraulically interposed between each of the first and second three-way valves and the corresponding brake of the selected one of the pair of front wheel brakes and the pair of rear wheel brakes.

26. The brake system of claim 23, wherein third and fourth two-position three-way valves are each hydraulically connected with the second reservoir, the second power transmission unit, and a corresponding brake of the other one of the pair of front wheel brakes and the pair of rear wheel brakes, the third and fourth three-way valves selectively controlling hydraulic fluid flow from a chosen one of the second reservoir and the second power transmission unit to the corresponding brake of the other one of the pair of front wheel brakes and the pair of rear wheel brakes;

an ABS modulator arrangement is hydraulically interposed between each of the third and fourth three-way valves and the corresponding brake of the other one of the pair of front wheel brakes and the pair of rear wheel brakes; and a backup ABS modulator arrangement is hydraulically interposed between each of the third and fourth three-way valves and a corresponding brake of the selected one of the pair of front wheel brakes and the pair of rear wheel brakes, with the first and second fluid separators hydraulically interposed between the backup ABS modulator arrangement and the corresponding brake of the selected one of the pair of front wheel brakes and the pair of rear wheel brakes.

* * * * *